Oct. 1, 1929. W. H. GINDER 1,729,937
TOASTING APPARATUS
Filed May 15, 1928   3 Sheets-Sheet 1
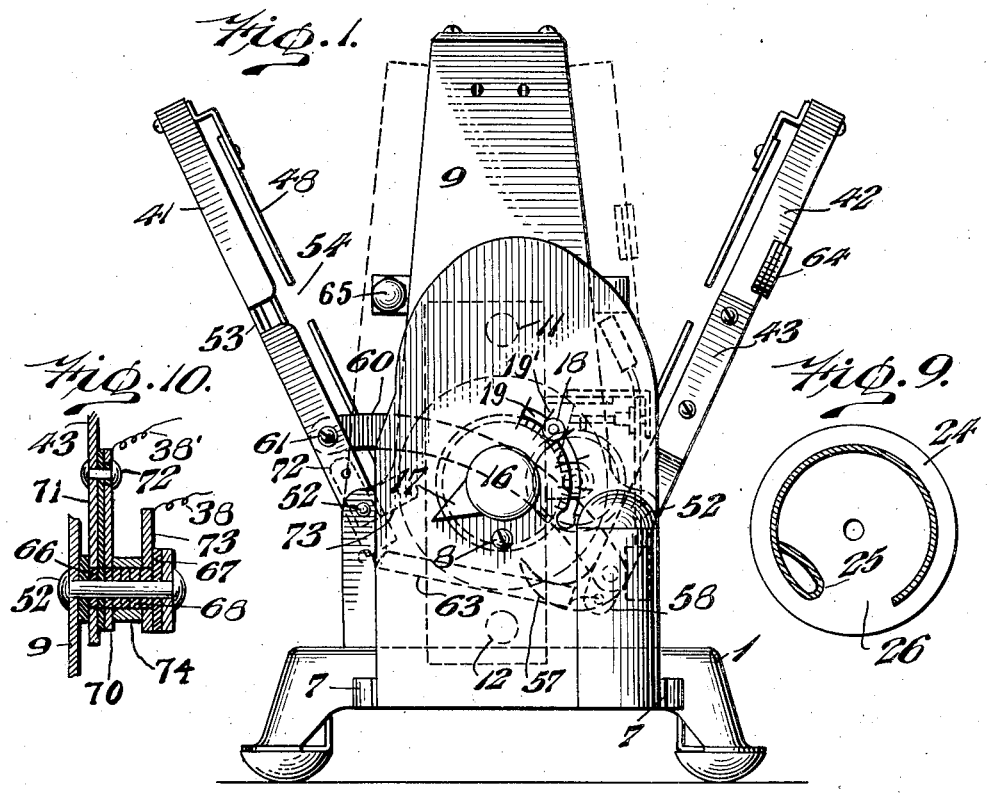
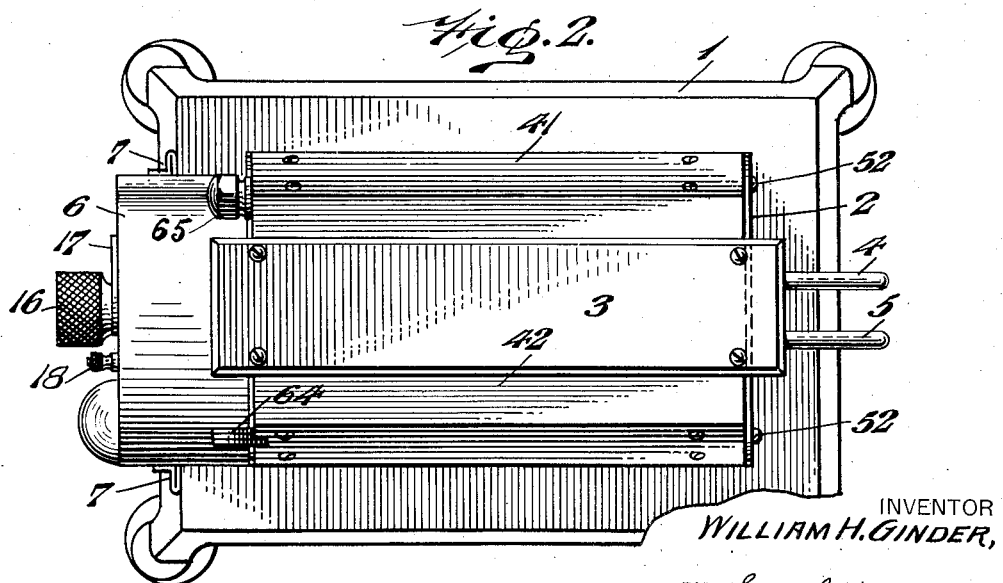
INVENTOR
WILLIAM H. GINDER,
BY Frank H. Borden
ATTORNEY.

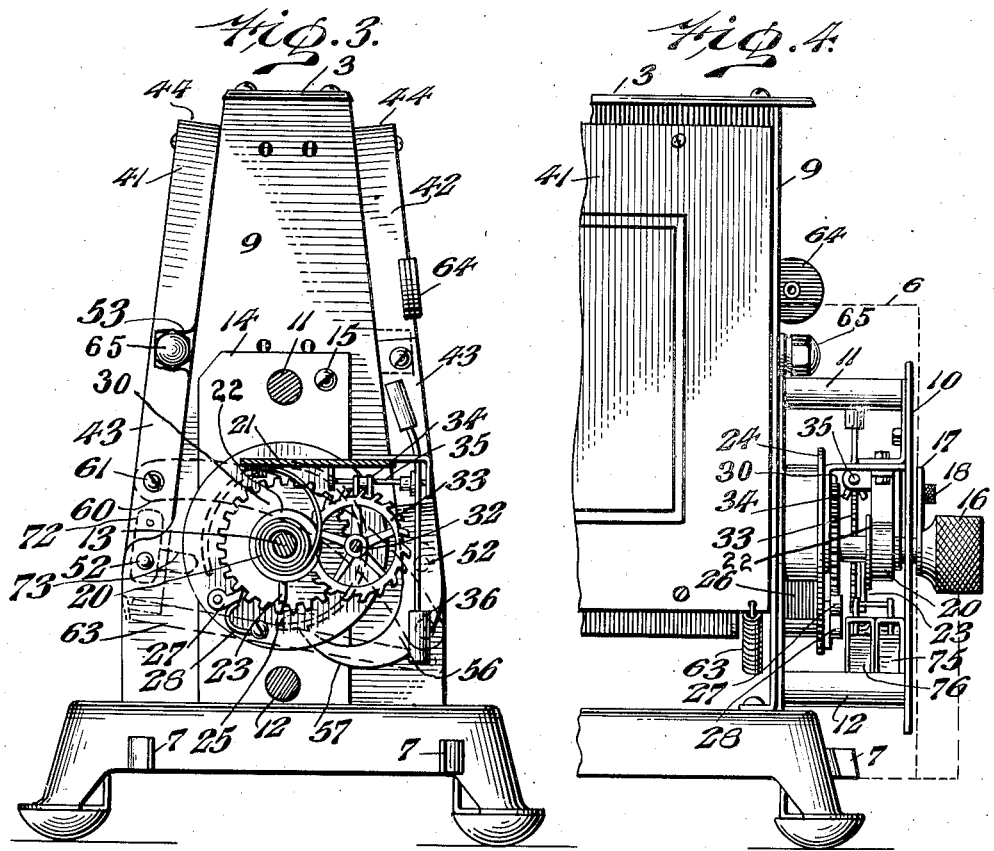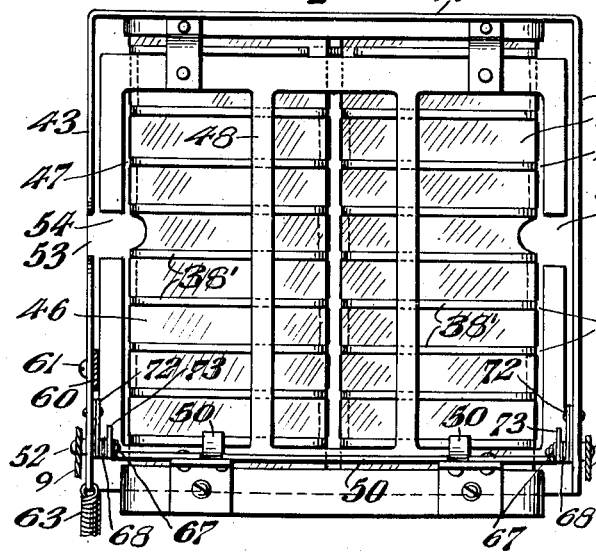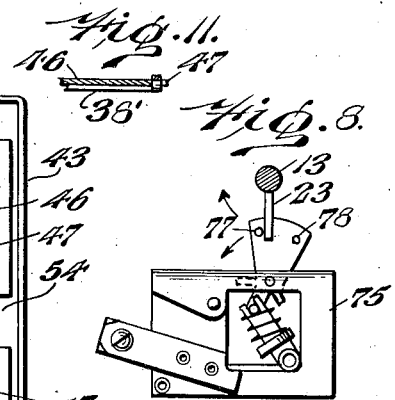

Oct. 1, 1929.　　W. H. GINDER　　1,729,937
TOASTING APPARATUS
Filed May 15, 1928　　3 Sheets-Sheet 3
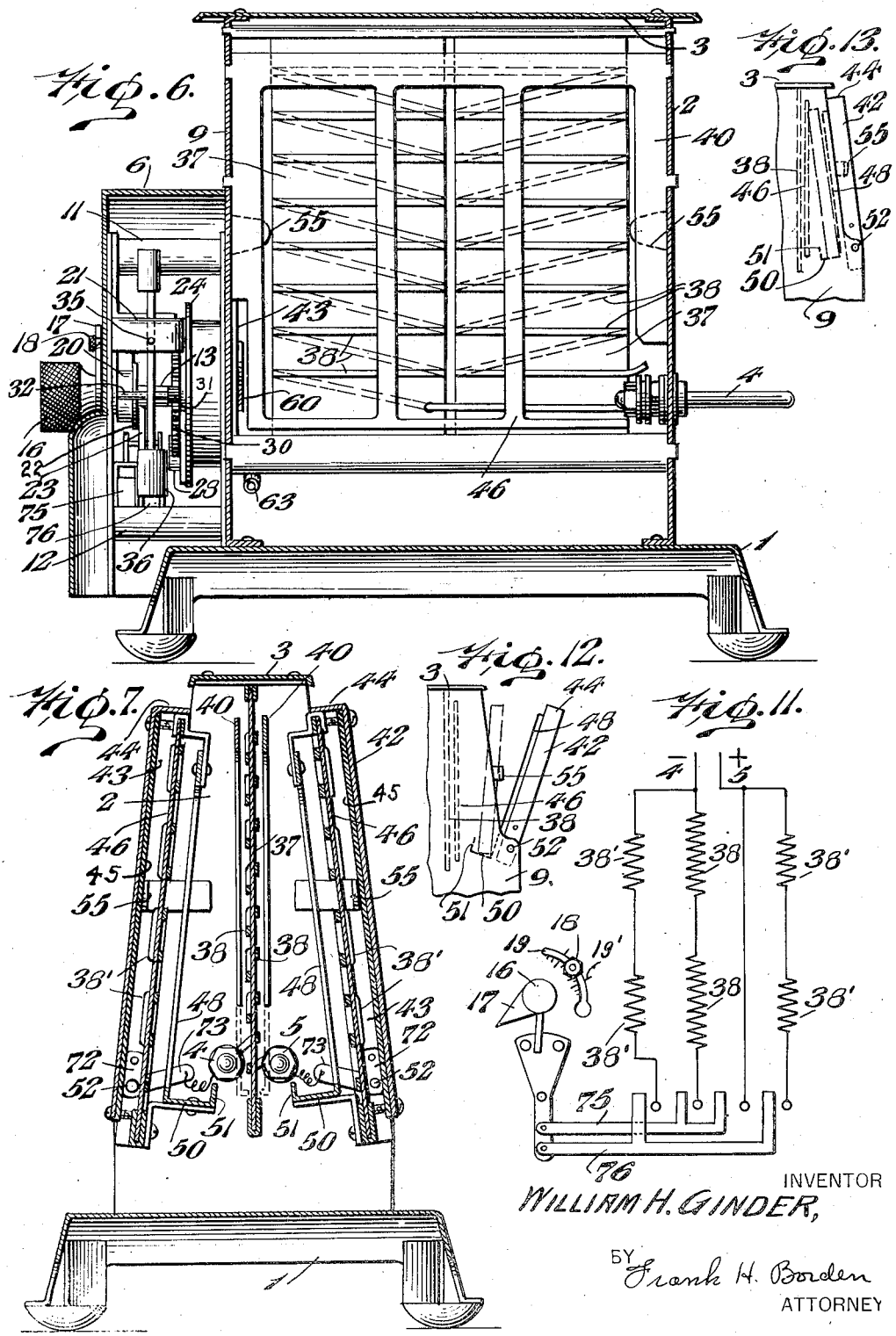

Patented Oct. 1, 1929

1,729,937

UNITED STATES PATENT OFFICE

WILLIAM H. GINDER, OF HADDONFIELD, NEW JERSEY, ASSIGNOR, BY DIRECT AND MESNE ASSIGNMENTS, TO ELECTRO MFG. COMPANY OF AMERICA, A CORPORATION OF PENNSYLVANIA

TOASTING APPARATUS

Application filed May 15, 1928. Serial No. 277,903.

This invention relates to toasting apparatus, and more particularly to electric toasters.

Among the objects of the invention are to provide an electric toaster with an improved timing mechanism; to provide an electric toaster with means for exposing the toasted material to the withdrawing action of the fingers without the possibility of burning the fingers; to simplify and improve time controlled mechanism for toasting apparatus; to provide an automatically operated toasting apparatus with means permitting manual operation thereof when desired; to provide a toasting apparatus obviating turning or reversing the toasted material in toasting both sides of the material; to provide a toasting apparatus capable of toasting both sides of a plurality of slices of material simultaneously; to reduce the cost of electric toasters; to simplify and improve the wiring of electric toasters; to provide an electric toaster with a central double faced resistance element, and movable single faced resistance elements whereby the total electric consumption is brought within safe limits of ordinary house wiring circuits; to provide in a toaster having a movable side element for engaging slices of material, means to position the slice in spaced relation to the side member for inserting or withdrawing such slice without contact with heated portions of the toaster; to provide an electric toaster with remote controls to obviate contact of the fingers with heated portions thereof; to provide an electric toaster with a movable side element having a resistance therein with connectors to the resistance obviating dangling wires in the toaster; and many other objects and advantages as will be more apparent as the description proceeds.

In the accompanying drawings forming part of this specification:

Fig. 1, represents an elevation of a device incorporated in a purely illustrative structure, with the movable side members in opened position in full lines, with portions of the timing and control mechanism in dotted lines, and also showing the closed position of the side members in dotted lines.

Fig. 2, represents a top plan of the device of Fig. 1, with the side members in closed position.

Fig. 3, represents an elevation partially in section, illustrative of some of the details of the improved timing and control mechanism.

Fig. 4, represents a fragmentary side elevation of the device, disclosing the arrangement of the timing and switch mechanism, with the housing for the timing mechanism shown in dotted lines.

Fig. 5, represents an elevation of one of the movable side members of the toaster disclosing the form assumed by the resistance element to direct heat in one direction only.

Fig. 6, represents a vertical section through the device, partially in elevation.

Fig. 7, represents a transverse vertical section through the device with the side members in extreme closed position.

Fig. 8, represents a detail of the switch mechanism and its operating element.

Fig. 9, represents a detail of the cam element controlling the movable side members.

Fig. 10, represents a detail of the hinge pin carrying the circuit into the movable side members.

Fig. 11, represents a wiring diagram of the toaster.

Fig. 12, represents a fragmentary diagrammatic elevation of a toaster according to this invention, with the side swung to open position, and with a slice of toast material shown supported in spaced relation to both heating elements as upon its insertion, or subsequent to the toasting operation, and Fig. 13, represents a similar view with the side swung to closed position, pushing the toast material from its position of rest against the finger into toasting association with both heaters.

It will be understood that the invention is susceptible to many forms, and that which is described herein is, although a preferable form, purely illustrative.

A base 1, preferably of stamped metal, has vertical end members 2 and 9 affixed to its upper surface. The end members 2 and 9 are bridged by a relatively narrow strip 3, forming the top of the toaster. From one end member 2 may extend contact elements 4 and 5 connected with the wiring of the toaster, as will be explained later. The other end member 9 may carry a removable housing 6, engaged at the bottom by clips 7 carried by the base 1, and held against the end member by a screw or bolt 8 extending into a convenient part of the frame work or support 10 of the timing and control mechanism, to be described.

End member 9 has a pair of horizontally extending vertically spaced struts 11 and 12, the free ends of which are connected to a framework 10 of plates and flanges, arranged to support and journal the rotatable and other portions of the time controlled mechanism. There is but one main rotatable operating shaft, 13, journalled for rotation in end member 9, or in a plate 14 upon which the struts 11 and 12 may also be mounted for cheapness of construction and ease of assembly, held to end member 9 by suitable means such as screws 15.

The main shaft 13 is journalled in the frame member 10, and extends through an opening in housing 6, being axially bored and threaded at its free end to removably receive the knurled knob or handle 16, through rotation of which the shaft is turned, the timing mechanism is energized, the side members closed, as will be explained. It might be noted at this point that the handle or knob carries a pointer or indicator 17, rotatable with the knob, arranged to abut the adjustable stop 18, mounted in the arcuate slot 19 in the housing.

Preferably directly behind the outer plate of the frame 10, is the clock spring 20, permanently affixed at one end to an overhanging frame plate 21, coiled about and anchored or affixed to shaft 13 in any desired manner. It will be observed that rotation of shaft 13 is resisted by tightening of the coils, in one direction, storing up energy, released by mechanism to be described, and rotating the shaft 13 in the opposite direction. The clock spring is held in alignment by a washer 22 mounted on shaft 13, and held against axial movement thereon by pin 23. One end of this pin may extend well below the periphery of the washer in position to trip and actuate switch mechanism in the cycle of movement of shaft 13. The switch mechanism that is preferred will be subsequently described.

A cam wheel 24 having an inwardly extending curved track or guide 25, at the mouth of a cam opening 26 in the periphery of the wheel, is rigidly mounted upon and rotatable with shaft 13, and is arranged to operate the movable members through a lever riding upon the cam surface and into the slot or mouth, as will be detailed later. The outer face of the cam wheel 24 carries a detent or pawl 27, the engagement of which is controlled by a spring 28. The pawl or detent 27 is pivotally mounted on the cam wheel and extends in the plane of a gear 30, rotatably and freely mounted on shaft 13, but held in mesh with a pinion 31 mounted on shaft 32, parallel with shaft 13, supported by the frame 10. Pinion shaft 32 carries an escapement wheel 33, the movement of which is controlled by the oscillating escapement or trip 34, mounted transversely in the frame 10, on shaft 35, which also carries the pendulum 36 swinging in a plane substantially parallel with shaft 13.

It will be observed that clockwise rotation of the knob or handle 16 stores up energy in the clock spring, rotates the cam wheel relative the gear wheel 30, permitted by the spring pressed pawl or detent 27. The limit of clockwise rotation having been reached, as by contact of the indicator 17 with the adjustable stop 18 in the face of the housing, the pawl 27 drops into mesh with the teeth of the gear wheel, the energy of the spring is transmitted through shaft 13, through the cam wheel 24, the gear 30, into the escapement mechanism thus actuating the pendulum and permitting the timed return of the shaft 13, to neutral or normal position, in a counter-clockwise direction.

Extending longitudinally of the base between the end members is a central heating unit 37. As shown in Fig. 6, this unit is preferably in two parts having windings of resistance material 38, wound about cores of mica or the like, exposing a heating surface on both sides of the unit. The resistance may be joined directly, or through suitable connectors or switches, to the contacts 4 and 5 emerging from the toaster. In spaced relation to the heating unit is a guard 40 preventing contact between the resistance and the material to be toasted.

Preferably pivotally connected to the toaster body, although obviously susceptible to other forms of positioning so long as they are in part at least movable relative to the central heating unit, are the movable side members 41 and 42. As the side members are substantially identical except for their operating levers, but one will be described in detail.

The movable side member, as 41, comprises an outer surface of sheet material having inturned flanges 43 at the side edges, and 44 at the top edge. The inner surface of the sheet material may be lined with insulating material as asbestos or the like, 45. This is to prevent waste of heat through the member 41, and to act as a reflector to the heating unit. The heating unit comprises preferably two strips of mica or the like, 46, having notches or recesses 47 at spaced points on their side edges, upon which mica resistance material is laid, as at 38', extending across the faces of the mica strips away from the insulation sheet, in substantially horizontal positions, and extending vertically between the notches to bridge the space between the heating strips. In effect, and except for the small area of resistance on the back or non-toasting side of the unit, the heating unit has resistance material on but one side, and that the side located toward the central heating unit when the side member is assembled in the toaster. Aside from the economy in this procedure derived from savings in current consumed, and the reduction of the heat lost, as well as the initial saving in material available, there is an important factor of safety in use that is presented by this construction, inasmuch as the total power consumed by the toaster may be designed to be well within the range of the ordinary house lighting circuit. It will be apparent that if, for example the central heating unit consumed 600 watts, and each side member did the same, the total of 1800 watts would be too heavy for the circuits for which these toasters are designed. By this, of course, is meant the domestic field of such devices. By substantially cutting the resistance of the side members in half, as is effected by the invention disclosed, the total consumption is brought well within the safe range.

Each side member is provided with a guard 48, in spaced relation to the heating unit, which may if desired be stamped from a single sheet of material, and provides thin strips against which the material to be toasted abuts in the operation of the toaster. In order to support the slices of material upon its insertion into the toaster, each side member preferably carries a horizontally disposed rack or tray 50, which as shown in Fig. 7, may be stamped from the material of the guard 48, perpendicular to the plane of such guard. Of course, the tray or rack may be rigidly mounted on the end members of the toaster, disconnected from the side members, or it might be pivotally mounted on the end members to effect a tilting action on the toasted material similar to the action in the figure noted. In any case the tray or rack is so located and disposed as to support the toasted material, and through such support, and through a change in its angular positioning incident to movement of the side member the toasted material is urged away from the central heating element and if otherwise unrestrained would, when the side member had been sufficiently moved from the central heating unit, tend to move with the side member. This action is facilitated by the edge flange 51 struck up from the tray or rack 50. It is to be noted in this connection that the side members are mounted on the end members 2 and 9 through pivotal points 52, which are so disposed relative to the tray or rack that when the side members are swung in pushing the slice of toast material against the central heating unit, the material is held in a position of angularity relative to the vertical, so that its natural tendency is to assume a vertical position on the tray when the restraining and compressing action of the side member is withdrawn, as the side member is moved on its pivot, or otherwise removed from close proximity to the central unit 37.

The side members 41 and 42 are preferably pivotally mounted on the end members 2 and 9, by pivot pins 52 engaging the respective side flanges 43 toward the lower portions thereof. One side flange 43 on the member 41 is cut away at about the center as at 53, and the adjacent portion of the guard 48 and if necessary of the heating unit behind it as well, as at 54, in order to receive the finger 55 carried by the end member 9. The finger 55 is substantially rigidly held in parallel spaced relation to the central heating unit of the toaster, vertically out of registry or alignment with the top piece 3, but not as far out as the limit of movement of side member 41. Except for the notch or cut out portion of side flange 43, this finger 55, with its registering notches and recesses in the guard and heating unit is duplicated on the side opposite, with relation to side member 42, and may of course be duplicated at the opposite ends of the side members as well. The fingers 55 form rests or supports for the toasted material, and provide means for maintaining the toast in spaced relation both to the central heating unit, and the side heating unit, so that the toast may be inserted or withdrawn without danger of burning the fingers through contact with heated portions of the toaster. As shown for instance in Fig. 1, the sides being moved to their outward limit, the toast or bread, or the like, may be lowered vertically by the operator between the top 3 and the finger 55, to rest upon the then outwardly tilted rack or tray, the inclination of which is such as to urge the material to rest against the finger 55. As the sides move inwardly toward the central heating unit, the guard 48 of each member engages the sliced material, pushing each out of contact with the finger 55, and against the guard of the central heating unit. This is facilitated by the change of inclination of the tray or rack. The material is then held by both units.

It will be clear that as the sides of the toaster are moved outwardly, the toasted material having been simultaneously toasted on both sides, will be urged away from its position abutting the central heating unit, and will be swung outwardly until it abuts the finger 55, and rests upon or against the finger while the sides move further away so that the hot toast extends substantially vertically in spaced relation to both heating units or elements, so that the operator may grasp it and withdraw it without touching heated portions of the toaster. It is of course advisable to insert the toast material initially between the finger and the central heating unit, otherwise the positioning of the toast may not take place. This would not interfere with the efficiency of the toaster in any way, of course.

In order to actuate and move the side members in synchronism, and by the time controlled mechanism previously described, the side member 42 has rigidly affixed to it an extension 56, terminating well below the pivot of the side member, in an inwardly extending curved end 57, arranged to ride upon the cam wheel 24 in its rotation, and to ride into the cam opening 26 in engagement with the curved element 25 of the cam wheel. The arrangement is such that with the curved end 57 forced out of the slot and into sliding engagement with the peripheral surface of the cam wheel, the side member 42 is in proper closed position for toasting. To coordinate the movements of the side members, a secondary extension 58, may be mounted on side member 42, terminating below the pivot point 52 thereof, to which a cross link 60 is pivoted, below the pivot point 52 of side member 42, and pivotally connected at 61 to the side member 41, above its pivotal point 52. The side members are continuously urged to open position by the tension spring 63.

It will be understood that with the side members in closed position, and the curved end of the extension riding on the periphery of the cam wheel, the toasting operation is taking place. As the cam wheel rotates counter-clockwise under the unwinding energy of the clock spring, as released by the escapement, the opening in the cam wheel approaches the end of the extension arm on side member 42. As the curved end rides into the opening in the cam wheel the side member 42 begins to move away from the central heating unit or element under the urge of the tension spring 63, engaged with both side members below their respective pivotal points, and simultaneously releases the other side member 41 from its closed position, through transverse movement of the cross-link 60. This is thought to be obvious from the disclosure.

It is to be noted moreover, that with the cam wheel turned to starting position, or within a few degrees of rotation therefrom, as will be pointed out in connection with the switch mechanism, the curved end of the extension arm on the side member 42 will be drawn up into the opening in the cam wheel, but, preferably, solely under the influence of the cross tension spring 63. Obviously the cam wheel may be provided with a track of such construction as to retain the end of the arm in engagement with the cam throughout its entire cycle of movements, if desired, and thus to obviate the necessity for the tension spring. However, by the construction disclosed, the side member 42 may be manually actuated, as by a knob, or handle 64, extending from a convenient point on the side member 42. Through this handle member 42 may be swung on its pivot when the cam opening (26) is so disposed as to permit the curved end of the extension arm to enter therein without regard to movement of the cam wheel. Member 41 will simultaneously be actuated, of course.

In order to hold the side members in closed position during the toasting operation under manual control, a wing or thumb nut 65 may be provided in the base or support of finger 55 on the side of the toaster adjacent side member 41 of such construction as to be disposed in the path of movement of the side flange 43 of said member, and to engage the edges of said flange adjacent the cut out portion or notch 53. This may be effected by causing the flange to extend between the nut and the base of finger 55, straddling the bolt or pin upon which the nut is moved. This lock feature is of value also in putting the toaster away when out of use, as it prevents the sides from extending to open position such as would otherwise occur.

It has been noted that the movable side members each contain or support a heating element or unit movable with the sides. It is desirable to convey current into such units without the numerous disadvantages of dangling wires or other conductors, as such wires militate against sales of the devices, and furnish points of breakage owing to the continuous flexing of the wires in the use of the devices. As a means for safely conducting the supply into and from the movable heating elements, the pivot pins 52, may be constructed as shown in detail in Fig. 10. As shown in this figure the pin 52 is riveted to the end members 2 or 9, and extends for a little distance inwardly from such member. The flange 43 of a side member has an opening preferably somewhat larger than the pin 52 so as to be concentrically spaced therefrom. An insulating washer 66 may be inserted about the pin 52 in the space in flange 43. A series of insulating washers, such as of mica, including two of appreciable diameter, as 67, are spaced by numerous smaller washers, as 68 which latter form bearings for the rotatable support of a supporting and conducting arm 70, upon which the flange 43 is affixed in insulated relation through an interposed insulating strip 71, by insulated connecting means 72, and which also serves as a conductor from which leads emerge to the heating element or unit carried by the side member.

A supplemental or secondary conducting arm 73 is oscillatively mounted on the mica or similar washers 68, axially spaced from the supporting and conducting arm 70, by means of a resilient split washer 74 frictionally bearing against the adjacent portions of the two arms 70 and 73, to establish permanent electrical contact between them regardless of their relative angular disposition. It will be clear that if a conductor leads to the arm 73, which is preferably stationarily mounted on the toaster, the current passes through the conductor and through arm 73, through the interposed split washer 74, and into and through the supporting conducting arm 70, thence through appropriate leads into the heating unit, and that this circuit is maintained regardless of the movement of the side member. It is to be noted however that the side member itself, as well as the other frame portions of the toaster are maintained in insulated relation as regards the resistances and the electric circuit passing therethrough. It is preferred that the insulated electric conducting pivot be provided at each pivot point, the stationary conducting arms extending inwardly of the toaster to contact with the switch mechanism to be described, and with other conductors, while the movable pivoted arm connects with the heating unit or element on each side member at the respective ends thereof.

In order to simplify and render more certain the efficient functioning of the toaster, the central heating unit or element is on a separate circuit from the two movable side elements, which are on another circuit. In carrying out this construction it is preferred to utilize a separate switch mechanism for each circuit. To this end a pair of substantially identical switches 75 and 76 are provided, preferably of the toggle type, coupled together so as to function simultaneously, but each controlling a separate circuit. In this connection it is to be noted that there are numerous relatively inexpensive switches on the market capable of carrying the load imposed by either circuit, but possibly not strong enough nor heavy enough to carry the load of the complete total consumption of both circuits, so that the provision of two switches of this type is an element in the economy of construction available from the invention. The switches may be joined by a pair of spaced rivets 77 and 78, lying alternately in the path of movement of the pin 23 carried by the main shaft 13. This is best shown in Fig. 8. Clockwise movement of the shaft 13 brings the pin 23 into tripping engagement with forward pin or rivet 77, tripping both switches and closing the circuits in both sets of heating elements. Continued clockwise movement, as in the setting of the time for the escapement has no further circuit controlling function. When the escapement permits the counterclockwise movement of shaft 13 to a desired point, the pin 23 trippingly engages the rearward pin or rivet 78, opening the circuits through the heating elements. It will be clear that the movement of the shaft 13 such as to open and close the circuits may be so arranged as to be within the range of angular disposition of the cam wheel as to maintain the curved end of the extension on side member 42 in registry with the cam opening so as to permit manual manipulation of the side members.

The manual manipulation of the side members for operator timed toasting in lieu of automatic is an important feature, and for this purpose such supplemental switches or switch controls as may be necessary may be inserted in the circuits. The simplest procedure, however, is the provision of any desirable means, (not shown) such as may be thrown into the path of indicator 17, in the counterclockwise movement of shaft 13, so that with the switches tripped so that the circuits are closed, further operation of shaft 13 beyond the slight initial movement to trip the switches is unnecessary, and the manual operation of the toaster may be carried on. When it is desired to resume the time controlled toasting of the bread, such means as had been interposed in the path of the indicator 17, or knob 16, may be removed, permitting the clockspring to unwind, to cause the escapement to be further energized, thus permitting the concluding counterclockwise movement of the shaft 13 to an extent sufficient to trip the switches and open the circuits.

In the diagrammatic showing of Fig. 11, the circuits and circuit controlling mechanism are disclosed in a thoroughly practicable manner, although it will be understood that the switch controlling the circuit through the central heating unit will be interposed, preferably, between the pair of resistance elements composing the unit, instead of at the end of both elements, through a conductor leading through the toaster to the contacts 4 and 5 in the end thereof.

The operation of the device in the preferred form is substantially as follows: the side members 41 and 42 being in their extreme outward position, and contacts 4 and 5 being plugged into a circuit, slices of material to be toasted are inserted downwardly between the top 3 and the fingers 55 to rest upon the tray or rack 50. The stop 18 is set at the proper adjusted position for the degree of toasting desired, by loosening the nut, and sliding the stop about in the arcuate slot 19, to the proper graduation 19', then tightening the nut to locate the stop. The circuits are open.

The knob or handle 16 is then rotated clockwise, until the pointer or indicator 17 abuts the stop 18, and is then released.

During the rotation, the pin 23 has tripped both switches and closed the circuits, thus energizing the heating elements; the cam wheel has been rotated forcing the curved end of the extension arm on member 42 out of the cam wheel opening 26, and simultaneously causing both side members to closed position against the resistance of the tension spring 63; the movement of the side members has moved the slices of material from its point of rest against the respective fingers 55, into toasting engagement with the central heating unit; and the clockspring has stored up energy sufficient to move the shaft 13 as permitted by the escapement. Toasting proceeds.

Both sides of each slice of material are being toasted simultaneously during the unwinding or counterclockwise movement that ensues upon release of the knob or handle 16. The escapement permits the unwinding of the clock spring, and the rotation of the shaft 13 and of the cam wheel 24 during which time the toasting is under way. In its counterclockwise cycle of movement the cam wheel rotates until the curved end of the extension arm on member 42 may enter the cam opening 26, when the doors, or side members begin to open under the influence of the tension spring 63. Opening of the door, or movement of the side member causes the now toasted material to be swung out of engagement with the central unit and over into resting engagement with the adjacent finger 55, while the opening movement continues so as to remove the heated side members from undue proximity to the positioned toast. The pin 23 has meanwhile tripped the switches and broke the circuits. The toast, completely toasted in a single operation, may be withdrawn safely without burning the fingers, as has been noted.

That the invention is susceptible to many forms and may be embodied in many modifications will be evident, and it is desired to have such possibilities in mind in construing the appended claims. That the invention presents a simple, economical, thoroughly practical and efficient device for the intended purpose is thought to be apparent from the disclosure without enlarging upon the individual advantages inherent in the several phases of the invention.

I claim:

1. In an electric toaster, a pair of relatively movable heating surfaces, means for supporting material in spaced relation to each said surface in their separated positions only, with supplemental means independent of the first mentioned means cooperating with the material to cause it to rest upon said first mentioned means during the separation of the heating surfaces.

2. In an electric toaster in combination, a central heating surface, pivoted side heating surfaces, means urging the pivoted surfaces away from the central surface, and means operable to swing the side surfaces simultaneously into toasting association with the central heating surface.

3. In an electric toaster, a stationary part and a pivoted heating part, means urging the pivoted part away from the stationary part, means operable to force the pivoted part toward the stationary part, and supplemental means for holding the pivoted part toward the stationary part when desired.

4. In an electric toaster, a heating surface, a side movable from and toward the heating surface, means fixed with respect to the heating surface but spaced therefrom toward the movable side and having a portion in substantial parallelism with said heating surface arranged to position toast in a spaced relation to the heating surface which is greater than the toasting spaced relation of the toast and the heating surface.

5. In an electric toaster, a central heating surface, a pair of horizontally pivoted side members movable relative the surface, a generally vertical arm carried by one member, a transverse link pivoted to each side member at points respectively above and below the pivot points thereof and substantially below the heating surface, means operable to move said arm, and through the link to move both side members in synchronism.

6. In an electric toaster, a frame, a central heating unit mounted in the frame, a finger mounted on the frame and extending in substantial parallelism with the heating unit but in laterally spaced relation thereto, a pivoted side member mounted on the frame, notches formed in the side member in registry with the finger, the side member having a tray the inclination of which varies as the side member is swung on its pivot, the tray being arranged as the bottom support for a slice of bread or the like, the side member being arranged to swing on its pivot so that portions thereof extend closer to the central heating unit than the said finger, to push the operated bread against the central heating unit, but said finger so arranged as to form a lateral rest for the bread as it is swung outwardly from the central heating unit under the influence of the change of inclination of the tray incident to moving the side member from close proximity to the central heating unit.

7. In a toasting apparatus, a central element, a side element pivotally connected to the central element on a horizontal axis, said side element movable arcuately from a toasting position of substantial parallelism with the central element to a position of non-toasting angularity relative thereto, means arranged to support a slice of material in arcuately spaced relation to both elements and substantially radially of said axis.

8. In a toasting apparatus, a pair of relatively movable elements joined upon a horizontal axis, one element arcuately movable on the axis from a toasting position closely adjacent to the other element, to a position of angularity relative thereto, means arcuately spaced from one element and forming a guiding support for the insertion of material substantially radially of the axis when the elements are in their widely separated position, said movable element arranged to engage said material and move it toward the other element in its arcuate movement toward said element.

9. In a toasting apparatus, a stationary element and a pivoted side element connected to the stationary element on a horizontal axis, and arranged to swing arcuately from and to said element, means tending to urge a slice of material to remain in parallelism and to move with said side element, and means effective at a point arcuately spaced from the central element and from the lowermost arcuate position of the side member, to physically engage and maintain the toast in spaced relation to each element and substantially radially of the axis.

10. In a toasting apparatus, a pair of heating elements connected together on a horizontal axis and arranged for relative movement from a position of substantial parallelism to a position of angularity about said axis, supporting means arcuately spaced relative to one element arranged to permit the insertion and support of a slice of material substantially radially of said axis and in a position spaced from each element, said means being effective to support the slice during any arcuate movement of the other element below the arcuate disposition, but being ineffective when the said last mentioned element moves arcuately above said position.

11. In a toasting apparatus, a heating element and a relatively movable heating element joined on a horizontal axis, the movable element arcuately movable to present an open mouth for the removal or insertion of material, means arcuately spaced from each element for supporting such material so that it may be grasped without contact with either element, said means being inoperative during the closely associated position of said elements.

12. In a toasting apparatus, a pair of heating elements joined together on a horizontal axis, one element being movable on said pivot through an appreciable arc to a position of wide spacing from the other heating element from a position of substantial parallelism with said other element, means arcuately spaced from the other element and arranged to permit the radial insertion and removal of a slice of material and its support in spaced relation to each element, movement of the movable element past said means effecting movement of such slice.

13. In a toasting apparatus, a heating element and a relatively movable heating element, means connecting the elements on a horizontal axis, said movable element being arcuately movable away from the first mentioned element to form an open mouth and movable toward the first mentioned element to a position of substantial parallelism for a toasting operation, means arcuately spaced from the first mentioned element arranged to engage and support a slice of material upon the outward arcuate movement of the movable element to support same in radially extending arcuately spaced relation to both elements.

In testimony whereof I affix my signature.
WILLIAM H. GINDER.